US012791062B2

(12) United States Patent
R et al.

(10) Patent No.: US 12,791,062 B2
(45) Date of Patent: Nov. 10, 2026

(54) BEARING ASSEMBLY

(71) Applicant: GM GLOBAL TECHNOLOGY OPERATIONS LLC, Detroit, MI (US)

(72) Inventors: Suman Bargav R, Bengaluru (IN); Amit Kurekar, Madhya (IN); Peng Chen, Ann Arbor, MI (US); Diwakar Krishnaiah Jeeda, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 18/980,037

(22) Filed: Dec. 13, 2024

(65) Prior Publication Data

US 2026/0168536 A1 Jun. 18, 2026

(51) Int. Cl.
*F16C 35/02* (2006.01)
*F16C 17/02* (2006.01)

(52) U.S. Cl.
CPC ............ *F16C 35/02* (2013.01); *F16C 17/022* (2013.01); *F16C 2326/01* (2013.01)

(58) Field of Classification Search
CPC .. F16C 9/03; F16C 9/06; F16C 17/022; F16C 17/10; F16C 25/04; F16C 33/08; F16C 2360/18; F16C 2360/22; F16C 35/02; F16C 17/02
See application file for complete search history.

(56) References Cited

U.S. PATENT DOCUMENTS

| | | | | |
|---|---|---|---|---|
| 1,931,231 A * | 10/1933 | Luker | F16C 9/03 | 384/216 |
| 2002/0126924 A1* | 9/2002 | Okamoto | F16C 9/04 | 384/276 |
| 2012/0051679 A1 | 3/2012 | Bridgewater | | |
| 2014/0177989 A1* | 6/2014 | Rossmanith | F16C 23/041 | 408/1 R |

FOREIGN PATENT DOCUMENTS

| | | | | |
|---|---|---|---|---|
| DE | 7313090 U | 8/1973 | | |
| DE | 2629359 A1 | 1/1978 | | |
| DE | 102012024141 A1 | 6/2014 | | |
| EP | 2489888 A1 | 8/2012 | | |
| GB | 1522927 A * | 8/1978 | F16C 17/022 | |
| JP | 2003239976 A * | 8/2003 | F16C 17/02 | |
| WO | WO-2008072548 A1 * | 6/2008 | F16C 17/022 | |
| WO | WO-2008075567 A1 * | 6/2008 | F16C 23/041 | |

OTHER PUBLICATIONS

Machine Translation of JP-2003239976-A (Year: 2003).*
Machine Translation of WO-2008072548-A1 (Year: 2008).*
Machine Translation of WO-2008075567-A1 (Year: 2008).*
German Office Action from counterpart DE1020251037434, dated Sep. 17, 2025.

* cited by examiner

*Primary Examiner* — Alan B Waits

(57) ABSTRACT

A bearing assembly including: a housing defining a housing bore extending therethrough; a first chamfered surface of the housing at a first end of the housing bore; a second chamfered surface of the housing at a second end of the housing (Continued)

bore; a bearing shell seated in the housing bore, the bearing shell defining an aperture configured to receive a shaft, the bearing shell is wider than the housing bore; a first flange of the bearing shell seated on the first chamfered surface of the housing; and a second flange of the bearing shell seated on the second chamfered surface of the housing.

18 Claims, 4 Drawing Sheets

BEARING ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a bearing assembly for a rotatable shaft.

A bearing is installed on a rotating shaft to help support the shaft and reduce friction. The bearing allows the shaft to rotate freely while minimizing the amount of friction generated between the shaft and its housing. This helps to reduce wear and tear on the shaft and the housing, and can help extend the life of a machine including the shaft.

SUMMARY

The present disclosure provides for, in various features, a bearing assembly including: a housing defining a housing bore extending therethrough; a first chamfered surface of the housing at a first end of the housing bore; a second chamfered surface of the housing at a second end of the housing bore; a bearing shell seated in the housing bore, the bearing shell defining an aperture configured to receive a shaft, the bearing shell is wider than the housing bore; a first flange of the bearing shell seated on the first chamfered surface of the housing; and a second flange of the bearing shell seated on the second chamfered surface of the housing.

In further features, the first flange includes a first angled surface abutting the first chamfered surface and the second flange includes a second angled surface abutting the second chamfered surface.

In further features, each of the first angled surface and the second angled surface is at a 45° angle.

In further features, an inner bearing surface of the bearing shell is crowned and convex relative to an axis extending through an axial center of the aperture.

In further features, the inner bearing surface is crowned by about 0.002 mm.

In further features, the bearing shell protrudes 2-3 mm outward beyond the first end of the housing bore, and the bearing shell protrudes 2-3 mm outward beyond the second end of the housing bore.

In further features, the housing includes an upper half connected to a lower half with a fastener.

In further features, the bearing shell includes a first bearing half seated in the upper half of the housing, and the bearing shell includes a second bearing half seated in the lower half of the housing. The fastener compresses the first bearing half and the second bearing half together to bend the bearing shell and provide the bearing shell with a convex shape relative to an axis extending through an axial center of the aperture.

In further features, the housing is configured for installation on a vehicle motor.

In further features, the shaft is a rotatable shaft of a vehicle motor.

The present disclosure also provides for, in various features, a bearing assembly including: a housing defining a housing bore extending therethrough; a first chamfered surface of the housing at a first end of the housing bore; a second chamfered surface of the housing at a second end of the housing bore; a bearing shell seated in the housing bore, the bearing shell defining an aperture configured to receive a shaft, the bearing shell is wider than the housing bore; an inner bearing surface of the bearing shell that is convex relative to an axis extending through an axial center of the aperture; a first flange of the bearing shell including a first angled surface seated on the first chamfered surface of the housing; and a second flange of the bearing shell including a second angled surface seated on the second chamfered surface of the housing.

In further features, gaps are defined between outer edges of the bearing shell and the shaft seated in the housing bore.

In further features, the inner bearing surface is crowned by about 0.002 mm.

In further features, the housing includes an upper half connected to a lower half with a fastener.

In further features, the bearing shell includes a first bearing half seated in the upper half of the housing, and the bearing shell includes a second bearing half seated in the lower half of the housing; and the fastener compresses the first bearing half and the second bearing half together to bend the bearing shell and provide the bearing shell with a convex shape relative to an axis extending through an axial center of the aperture.

In further features, the housing is configured for installation on a vehicle motor.

In further features, the shaft is a rotatable shaft of a vehicle motor.

The present disclosure also provides for, in various features, a bearing assembly including: a housing defining a housing bore extending therethrough, the housing including an upper housing and a lower housing connected by a fastener; a first chamfered surface of the housing at a first end of the housing bore; a second chamfered surface of the housing at a second end of the housing bore; a bearing shell seated in the housing bore including an upper bearing in the upper housing and a lower bearing in the lower housing, the bearing shell defining an aperture configured to receive a shaft, the bearing shell is wider than the housing bore; an inner bearing surface of the bearing shell is convex relative to an axis extending through an axial center of the aperture; a shaft seated in the aperture defined by the bearing shell, gaps are defined between the shaft and outer edges of the bearing shell; a first flange of the bearing shell including a first angled surface seated on the first chamfered surface of the housing; and a second flange of the bearing shell including a second angled surface seated on the second chamfered surface of the housing.

In further features, the housing is configured for installation on a vehicle motor.

In further features, the shaft is a rotatable shaft of a vehicle motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure provides for a bearing assembly for a rotatable shaft. The bearing assembly is configured to support any suitable rotating shaft of a vehicle, such as an axle shaft, an output shaft, a drive shaft, etc. The present disclosure is applicable to non-vehicular applications as well. The shaft may thus be a rotating shaft of any other suitable machine. For example, the shaft may be a rotating shaft of a watercraft, aircraft, or powerplant, such as a wind turbine shaft, a hydroelectric turbine shaft, etc.

The bearing assembly includes a bearing shell, which has a width greater than a housing of the bearing assembly. Flanges at opposite ends of the bearing shell extend beyond a bore of the housing, and extend outward beyond the housing to overhang outer surfaces of the housing. The bearing shell thus has an overall width that is greater than a bore of the housing. Because the bearing shell is wider than the housing and extends out from within the housing bore, the bearing shell has an enhanced load carrying capacity and enhanced minimum oil film thickness. Fasteners compress opposing halves of the housing and bearing shell together, which bends the bearing shell and provides the bearing with a convex shape relative to an axis extending through an axial center of the aperture. This convex shape reduces wear between the shaft and the bearing shell at outer edges of the bearing shell, which extends the life of the bearing shell.

Figure 1:
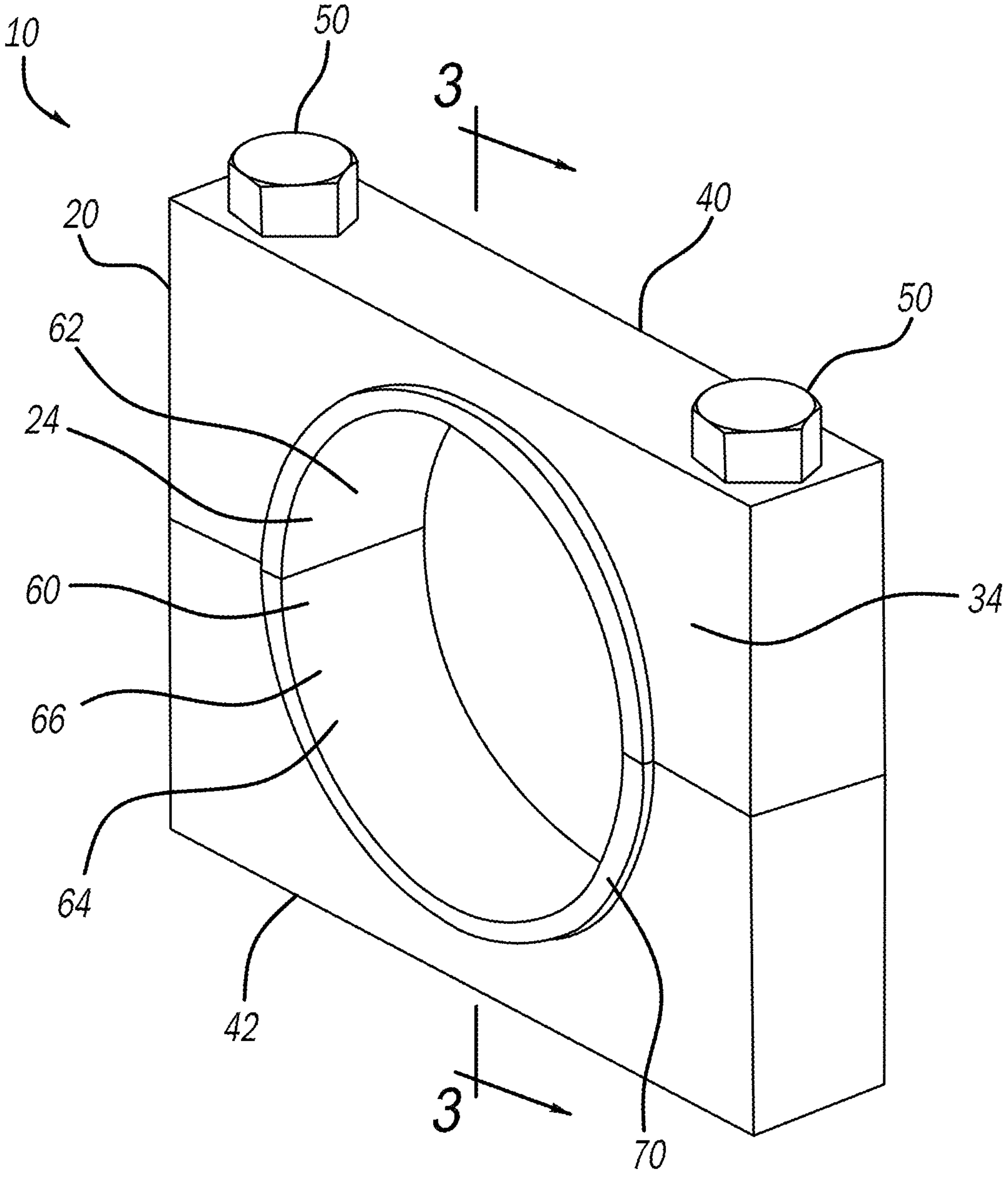
FIG. 1 is a perspective view of a bearing assembly in accordance with the present disclosure.
Figure 2:
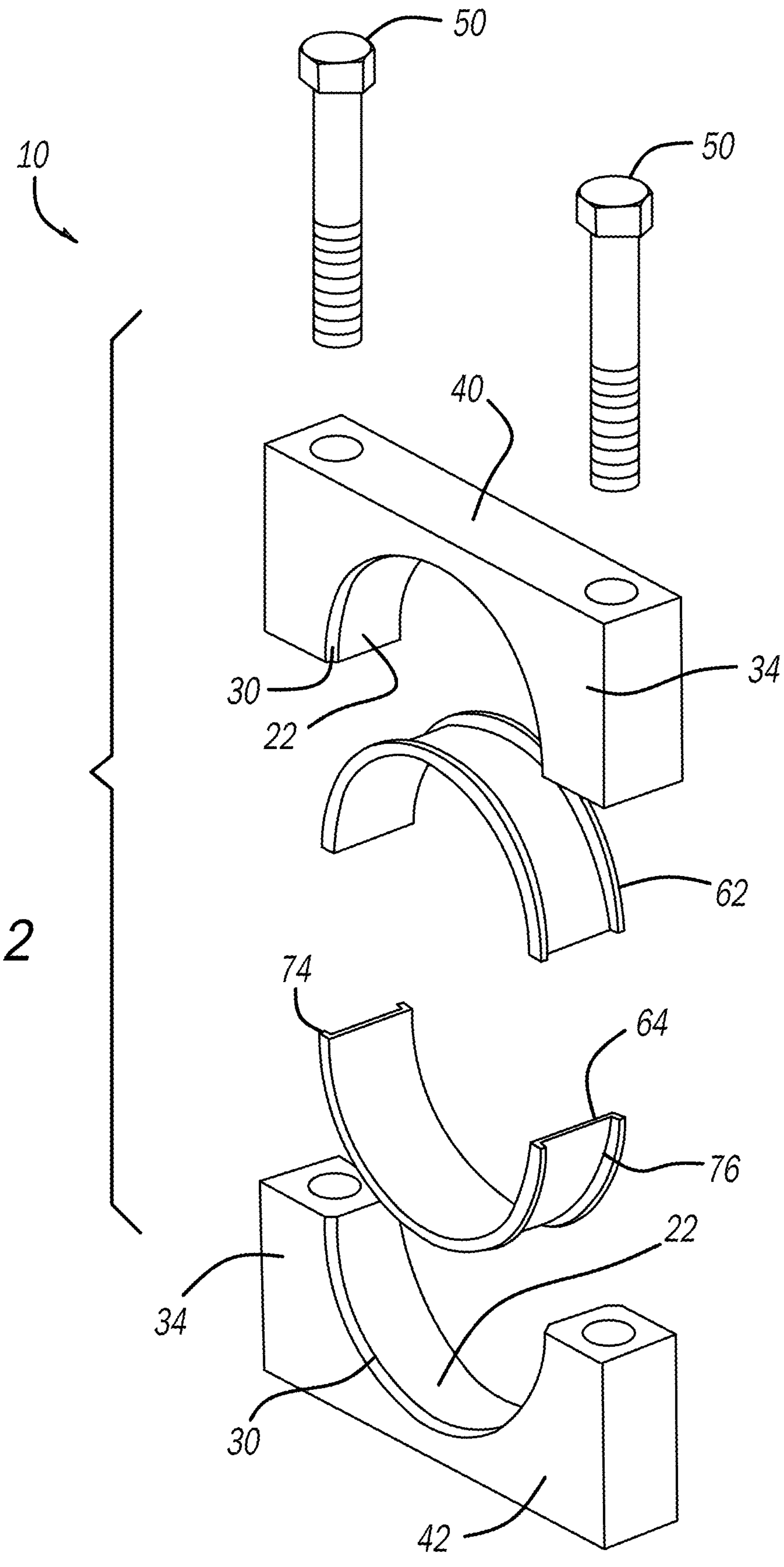
FIG. 2 is an exploded view of the bearing assembly of FIG. 1.

FIGS. 1 and 2 illustrate an exemplary bearing assembly 10 in accordance with the present disclosure. The bearing assembly 10 includes a housing 20 with an inner surface 22 (FIG. 2). The inner surface 22 is circular and defines a housing bore 24 (FIG. 1). With additional reference to FIGS. 3-5, a first chamfered surface 30 of the housing 20 is at a first end of the housing bore 24. A second chamfered surface 32 (FIG. 3) of the housing 20 is at a second end of the housing bore 24. The first chamfered surface 30 extends to a first outer surface 34 of the housing 20. The second chamfered surface 32 extends to a second outer surface 36 of the housing 20.

The housing 20 includes a first part 40 and a second part 42, which are connected together with fasteners 50. The fasteners 50 may be any suitable fasteners, such as screws, bolts, etc. The fasteners 50 compress the first part 40 and the second part 42 together. The first part 40 may be an upper half of the housing 20. The second part 42 may be a lower half of the housing 20.

A bearing shell 60 is seated on the inner surface 22 of the housing 20 within the housing bore 24. The bearing shell 60 is made of any suitable material. For example, the bearing shell 60 may be made of any suitable metallic material, such as copper, aluminum, steel, etc. The bearing shell 60 includes an inner bearing surface 66 (FIG. 1), which abuts a shaft 110 (FIG. 5) when the shaft 110 is seated within the housing bore 24. The shaft 110 may be any suitable rotating shaft of a vehicle, such as an axle shaft, an output shaft, a drive shaft, etc. The present disclosure is applicable to non-vehicular applications as well. The shaft 110 may thus be a rotating shaft of any other suitable machine. For example, the shaft 110 may be a rotating shaft of a watercraft, aircraft, or powerplant, such as a wind turbine shaft, a hydroelectric turbine shaft, etc.

The bearing shell 60 includes a first half 62 and a second half 64 (see FIGS. 1 and 2, for example). The first half 62 is seated in the first part 40 of the housing 20. The second half 64 is seated in the second part 42 of the housing 20. The fasteners 50 compress the first half 62 and the second half 64 together, as explained herein. Although termed first and second halves, the first half 62 and the second half 64 need not each be exactly one-half of the bearing shell 60, and may thus each be greater or less than one-half.

The bearing shell 60 further includes a first flange 70 and a second flange 72, which are on opposite ends of the bearing shell 60. The first flange 70 and the second flange 72 extend outward beyond the housing bore 24. The first flange 70 and the second flange 72 are each circular or generally circular and extend around the housing bore 24. At or adjacent to the first flange 70 is a first angled surface 74, which extends entirely around the first flange 70. At or adjacent to the second flange 72 is a second angled surface 76, which extends entirely around the second flange 72. The first angled surface 74 is seated on the first chamfered surface 30. The second angled surface 76 is seated on the second chamfered surface 32. A portion of the first flange 70 extends beyond the first chamfered surface 30 to abut the first outer surface 34. A portion of the second flange 72 extends beyond the second chamfered surface 32 to abut the second outer surface 36. The cooperation between the first flange 70 and both the first angled surface 74 and the first outer surface 34—and the cooperation between the second flange 72 and both the second angled surface 76 and the second outer surface 36—retains stiffness in the bearing shell 60. The first angled surface 74 and the second angled surface 76 may extend at any suitable angle, such as 45° or at any other suitable angle within a range of 30°-60°.

Figure 3:
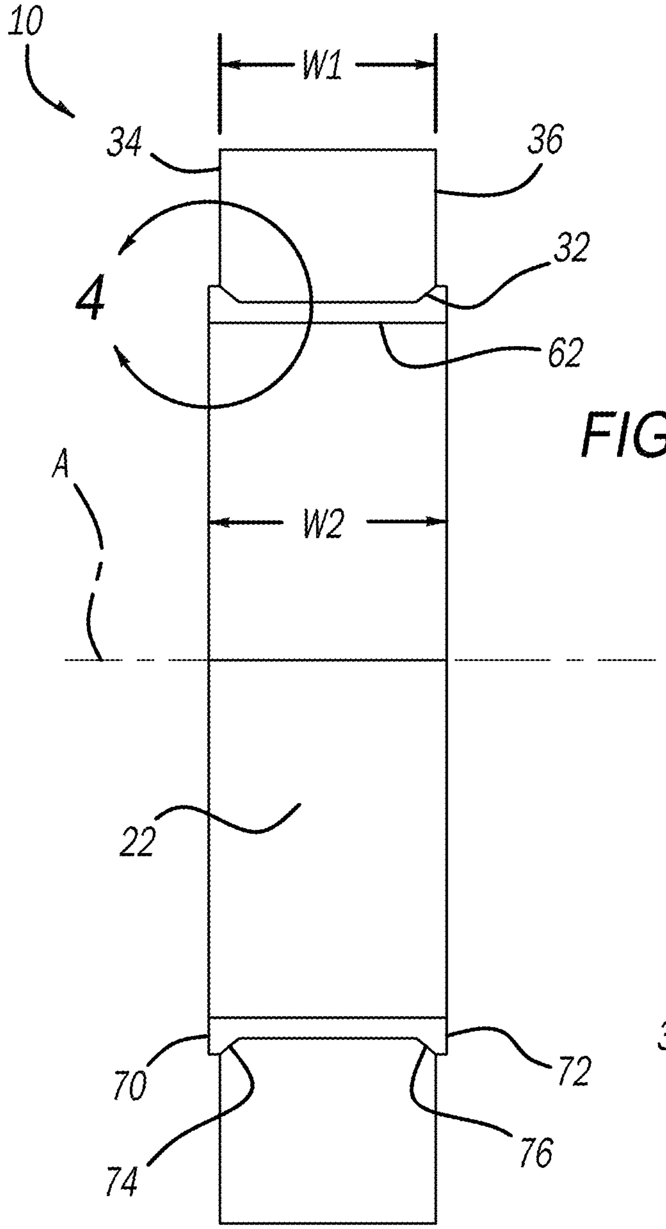
FIG. 3 is a cross-sectional view of the bearing assembly of FIG. 1
Figure 4:
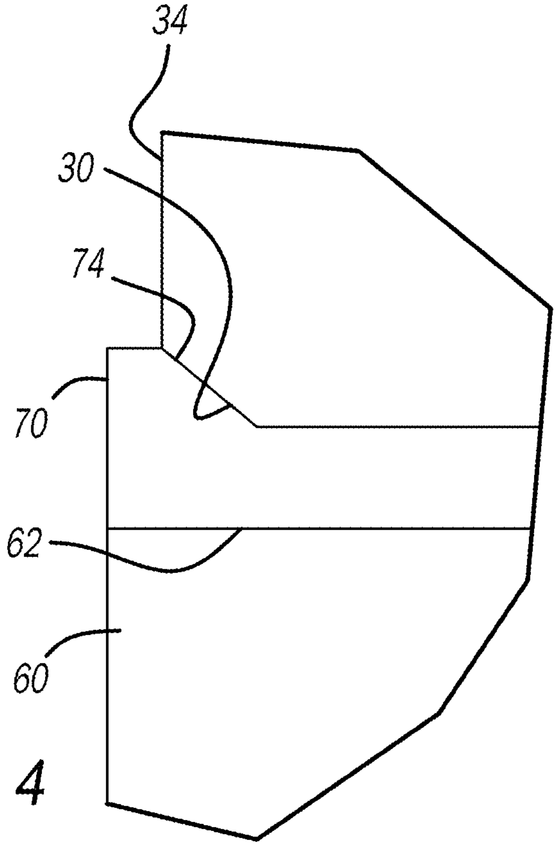
FIG. 4 illustrates area 4 of FIG. 3.

With particular reference to FIG. 3, the housing 10 has a housing width W1, which is measured between the first outer surface 34 and the second outer surface 36. The bearing shell 60 has a width W2, which may also be referred to as a length. The width W2 is measured from the first flange 70 to the second flange 72. The width W2 extends along an axis A. The axis A extends through an axial center of the housing bore 24. The width W2 of the bearing shell 60 includes the first flange 70 and the second flange 72. The greater width W2 of the bearing shell 60 improves performance of the bearing shell 60, such as with respect to load carrying capacity and oil film thickness. The width W2 is about 4-6 mm greater than the width W1. The bearing shell 60 protrudes about 2-3 mm beyond the first outer surface 34, and the bearing shell 60 protrudes about 2-3 mm beyond the second outer surface 36.

The bearing assembly 10 is assembled by placing the first half 62 of bearing shell 60 on the inner surface 22 of the first part 40 of the housing 20, and by placing the second half 64 of the bearing shell 60 on the inner surface of the second part 42 of the housing 20. The first part 40 and the second part 42 of the housing 20 are then tightened together, such as with the fasteners 50. As the first part 40 and the second part 42 are tightened together, the first half 62 and the second half 64 of the bearing shell 60 are compressed together. The compression is facilitated by cooperation between the first flange 70 and the angled surface 74—and by cooperation between the second flange 72 and the angled surface 76—as the first part 40 is tightened against the second part 42, which compresses the first half 62 and the second half 64 together.

Figure 5:
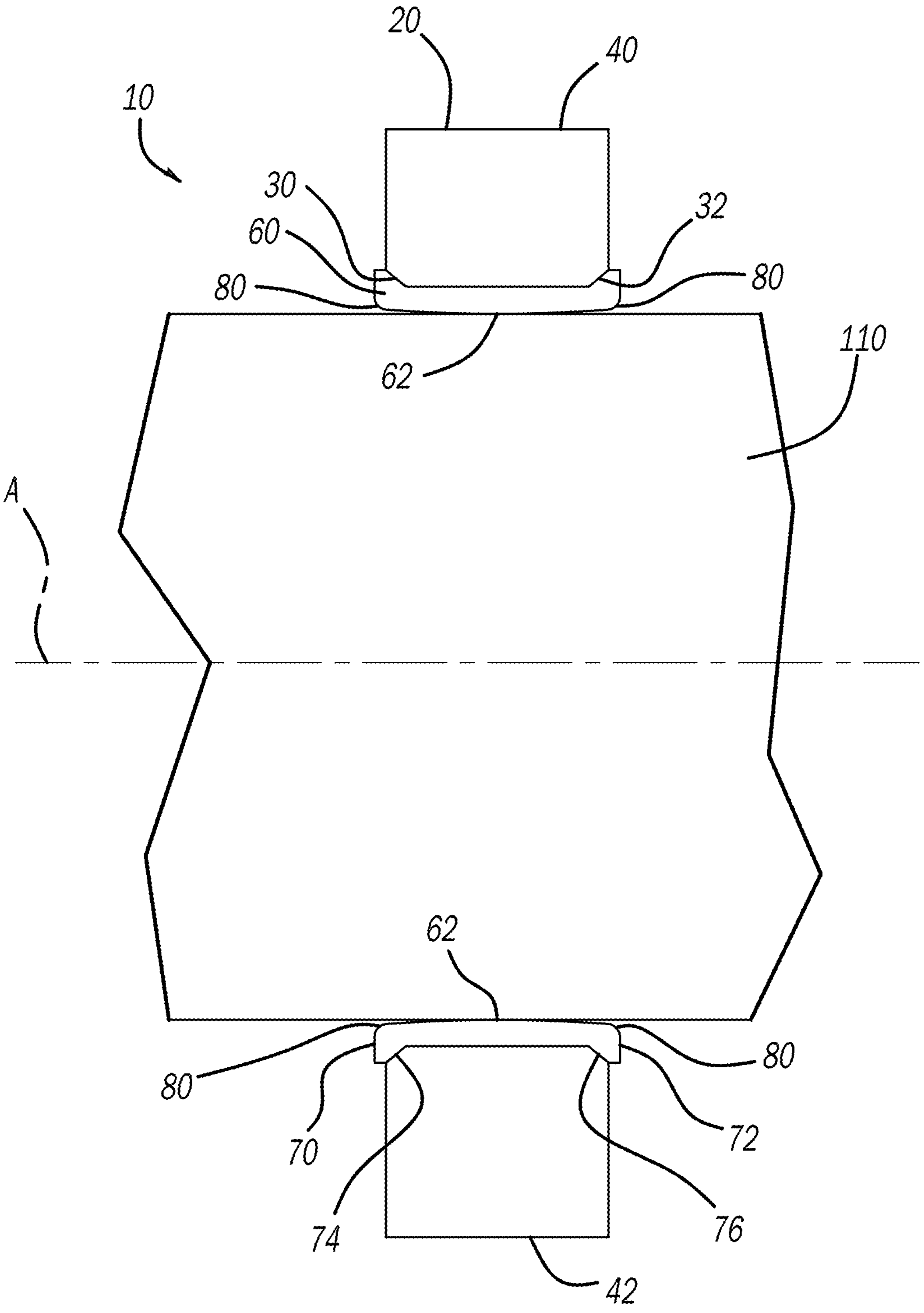
FIG. 5 is a cross-sectional view similar to FIG. 3, but with the bearing assembly installed on a shaft.

This compression bends the bearing shell 60 to provide the bearing shell 60 with a convex shape relative to the axis A extending through the axial center of the housing bore 24, as illustrated in FIG. 5. The bearing shell 60 is thus crowned at generally a midpoint between the first flange 70 and the second flange 72. This convex/crowned shape of the bearing shell 60 (which may also be considered as an hour-glass shape at an interior of the bearing shell 60), prevents contact between outer edges 80 (FIG. 5) of the bearing shell 60 (proximate to both the first flange 70 and the second flange 72) and the shaft 110, which reduces wear on the bearing shell 60. Thus, gaps are defined between the outer edges 80 of the bearing shell 60 and the shaft 110. The bearing shell 60 crowns inward by about 2 microns, for example.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A bearing assembly comprising:

a housing defining a housing bore extending therethrough;

a first chamfered surface of the housing at a first end of the housing bore;

a second chamfered surface of the housing at a second end of the housing bore;

a bearing shell seated in the housing bore, the bearing shell defining an aperture configured to receive a shaft, the bearing shell is wider than the housing bore;

a first flange of the bearing shell seated on the first chamfered surface of the housing; and a second flange of the bearing shell seated on the second chamfered surface of the housing, wherein:

the first flange abuts the first chamfered surface, each of the first flange and the first chamfered surface are planar and extend at a first angle;

the second flange abuts the second chamfered surface, each of the second flange and the second chamfered surface are planar and extend at a second angle; and an inner bearing surface of the bearing shell is crowned and convex relative to an axis extending through an axial center of the aperture, the inner bearing surface slopes continuously outward from a center of the bearing shell to and over the first flange and the second flange.

2. The bearing assembly of claim 1, wherein each of the first angle and the second angle are a 45° angle.

3. The bearing assembly of claim 1, wherein the inner bearing surface is crowned by 0.002 mm.

4. The bearing assembly of claim 1, wherein the bearing shell protrudes 2-3 mm outward beyond the first end of the housing bore, and the bearing shell protrudes 2-3 mm outward beyond the second end of the housing bore.

5. The bearing assembly of claim 1, wherein the housing includes an upper half connected to a lower half with a fastener.

6. The bearing assembly of claim 5, wherein:

the bearing shell includes a first bearing half seated in the upper half of the housing, and the bearing shell includes a second bearing half seated in the lower half of the housing; and wherein the fastener compresses the first bearing half and the second bearing half together.

7. A vehicle motor comprising the bearing assembly of claim 1.

8. The vehicle motor of claim 7, wherein the shaft is a rotatable shaft of the vehicle motor.

9. A bearing assembly comprising:

a housing defining a housing bore extending therethrough;

a first chamfered surface of the housing at a first end of the housing bore;

a second chamfered surface of the housing at a second end of the housing bore;

a bearing shell seated in the housing bore, the bearing shell defining an aperture configured to receive a shaft, the bearing shell is wider than the housing bore;

an inner bearing surface of the bearing shell that is convex relative to an axis extending through an axial center of the aperture;

a first flange of the bearing shell including a first angled surface seated on the first chamfered surface of the housing; and a second flange of the bearing shell including a second angled surface seated on the second chamfered surface of the housing, wherein:

each of the first flange and the first chamfered surface are planar and extend at a first angle;

each of the second flange and the second chamfered surface are planar and extend at a second angle; and the inner bearing surface of the bearing shell slopes continuously outward from a center of the bearing shell to and over the first flange and the second flange.

10. The bearing assembly of claim 9, wherein gaps are defined between outer edges of the bearing shell and the shaft seated in the housing bore.

11. The bearing assembly of claim 9, wherein the inner bearing surface is crowned by 0.002 mm.

12. The bearing assembly of claim 9, wherein the housing includes an upper half connected to a lower half with a fastener.

13. The bearing assembly of claim 12, wherein:

the bearing shell includes a first bearing half seated in the upper half of the housing, and the bearing shell includes a second bearing half seated in the lower half of the housing; and wherein the fastener compresses the first bearing half and the second bearing half together.

14. A vehicle motor comprising the bearing assembly of claim 9.

15. The vehicle motor of claim 14, wherein the shaft is a rotatable shaft of the vehicle motor.

16. A bearing assembly comprising:

a housing defining a housing bore extending therethrough, the housing including an upper housing and a lower housing connected by a fastener;

a first chamfered surface of the housing at a first end of the housing bore;

a second chamfered surface of the housing at a second end of the housing bore;

a bearing shell seated in the housing bore including an upper bearing in the upper housing and a lower bearing in the lower housing, the bearing shell defining an aperture configured to receive a shaft, the bearing shell is wider than the housing bore;

an inner bearing surface of the bearing shell is convex relative to an axis extending through an axial center of the aperture;

a shaft seated in the aperture defined by the bearing shell, gaps are defined between the shaft and outer edges of the bearing shell;

a first flange of the bearing shell including a first angled surface seated on the first chamfered surface of the housing; and a second flange of the bearing shell including a second angled surface seated on the second chamfered surface of the housing, wherein:

each of the first flange and the first chamfered surface are planar and extend at a first angle;

each of the second flange and the second chamfered surface are planar and extend at a second angle; and the inner bearing surface of the bearing shell slopes continuously outward from a center of the bearing shell to and over the first flange and the second flange.

17. A vehicle motor comprising the bearing assembly of claim 16.

18. The vehicle motor of claim 17, wherein the shaft is a rotatable shaft of the vehicle motor.

* * * * *